United States Patent
Liu et al.

(10) Patent No.: US 9,640,175 B2
(45) Date of Patent: May 2, 2017

(54) PRONUNCIATION LEARNING FROM USER CORRECTION

(75) Inventors: Wei-Ting Frank Liu, Redmond, WA (US); Andrew Lovitt, Redmond, WA (US); Stefanie Tomko, Bellevue, WA (US); Yun-Cheng Ju, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 797 days.

(21) Appl. No.: 13/268,281

(22) Filed: Oct. 7, 2011

(65) Prior Publication Data
US 2013/0090921 A1 Apr. 11, 2013

(51) Int. Cl.
*G06F 17/21* (2006.01)
*G10L 15/06* (2013.01)
*G10L 21/00* (2013.01)
*G10L 15/00* (2013.01)
*G09G 5/00* (2006.01)
*H04M 1/64* (2006.01)
*H04M 3/00* (2006.01)
(Continued)

(52) U.S. Cl.
CPC ........... *G10L 15/063* (2013.01); *G10L 15/22* (2013.01); *G10L 2015/0638* (2013.01); *G10L 2015/221* (2013.01)

(58) Field of Classification Search
USPC ..... 704/10, 275, 249, 2, 251, 243, 231, 235, 704/244, 255, 8, 260, 250, 3, 246, 204, 704/257, 254; 345/156; 455/418; 379/88.01; 340/994; 434/157
See application file for complete search history.

(56) References Cited

U.S. PATENT DOCUMENTS 5,251,283 A 10/1993 Honis
5,774,628 A * 6/1998 Hemphill .............. G10L 15/193
704/243

(Continued)

OTHER PUBLICATIONS

Abdou, et al., "Computer Aided Pronunciation Learning System Using Speech Recognition Techniques", Retrieved at <<http://www.cs.toronto.edu/~asamir/papers/is06.pdf>>, International Conference on Spoken Language Processing, Sep. 17-21, 2006, pp. 849-852.

(Continued)

*Primary Examiner* — Pierre-Louis Desir
*Assistant Examiner* — Neeraj Sharma
(74) *Attorney, Agent, or Firm* — Fiala & Weaver P.L.L.C.

(57) ABSTRACT

Systems and methods are described for adding entries to a custom lexicon used by a speech recognition engine of a speech interface in response to user interaction with the speech interface. In one embodiment, a speech signal is obtained when the user speaks a name of a particular item to be selected from among a finite set of items. If a phonetic description of the speech signal is not recognized by the speech recognition engine, then the user is presented with a means for selecting the particular item from among the finite set of items by providing input in a manner that does not include speaking the name of the item. After the user has selected the particular item via the means for selecting, the phonetic description of the speech signal is stored in association with a text description of the particular item in the custom lexicon.

20 Claims, 9 Drawing Sheets

(51) Int. Cl.
  *G08G 1/123* (2006.01)
  *G09B 19/06* (2006.01)
  *A61B 8/00* (2006.01)
  *G10L 15/22* (2006.01)

(56) References Cited

U.S. PATENT DOCUMENTS

| | | | |
|---|---|---|---|
| 5,933,804 A | 8/1999 | Huang et al. | |
| 6,442,519 B1* | 8/2002 | Kanevsky et al. | 704/243 |
| 6,983,248 B1* | 1/2006 | Tahara et al. | 704/255 |
| 7,266,495 B1 | 9/2007 | Beaufays et al. | |
| 7,292,980 B1* | 11/2007 | August | G10L 13/00 704/251 |
| 7,415,100 B2* | 8/2008 | Cooper et al. | 379/88.01 |
| 7,430,503 B1* | 9/2008 | Walker | 704/8 |
| 7,596,370 B2* | 9/2009 | Chengalvarayan et al. | 455/418 |
| 7,676,365 B2 | 3/2010 | Hwang et al. | |
| 8,543,401 B2* | 9/2013 | Suendermann et al. | 704/243 |
| 8,577,681 B2* | 11/2013 | Roth et al. | 704/244 |
| 2002/0013707 A1* | 1/2002 | Shaw | G10L 15/063 704/257 |
| 2002/0048350 A1* | 4/2002 | Phillips | G10L 15/06 379/88.01 |
| 2004/0010409 A1* | 1/2004 | Ushida | G10L 15/30 704/246 |
| 2005/0159949 A1 | 7/2005 | Yu et al. | |
| 2006/0031070 A1* | 2/2006 | Abrego | G10L 15/187 704/243 |
| 2007/0050191 A1* | 3/2007 | Weider et al. | 704/275 |
| 2007/0055523 A1* | 3/2007 | Yang | G10L 21/06 704/257 |
| 2007/0239455 A1* | 10/2007 | Groble | G10L 13/08 704/260 |
| 2009/0004633 A1 | 1/2009 | Johnson et al. | |
| 2009/0112587 A1* | 4/2009 | Cote | G10L 15/187 704/244 |
| 2009/0204392 A1* | 8/2009 | Ishikawa | G10L 15/065 704/10 |
| 2009/0258333 A1* | 10/2009 | Yu | 434/157 |
| 2009/0281789 A1* | 11/2009 | Waibel | G06F 17/2735 704/3 |
| 2010/0057461 A1* | 3/2010 | Neubacher et al. | 704/243 |
| 2010/0100385 A1* | 4/2010 | Davis | G10L 13/00 704/260 |
| 2010/0223057 A1* | 9/2010 | Capman | G10L 17/02 704/250 |
| 2010/0312550 A1 | 12/2010 | Lee | |
| 2011/0288869 A1* | 11/2011 | Menendez-Pidal | G10L 15/144 704/256.1 |
| 2013/0021176 A1* | 1/2013 | Tu et al. | 340/994 |
| 2013/0030804 A1* | 1/2013 | Zavaliagkos | G10L 15/26 704/235 |
| 2013/0085747 A1* | 4/2013 | Li et al. | 704/10 |

OTHER PUBLICATIONS

Hincks, Rebecca., "Speech technologies for pronunciation feedback and evaluation", Retrieved at <<http://citeseerx.ist.psu.edu/viewdoc/download?doi=10.1.1.161.7862&rep=rep1&type=pdf>>, ReCALL, vol. 15, No. 1, 2003, pp. 3-20.

* cited by examiner

PRONUNCIATION LEARNING FROM USER CORRECTION

BACKGROUND

A speech interface (also referred to as a voice user interface) is a user interface that is operated by human voice. A speech interface can enable a human to interact with computers and other devices in order to initiate an automated service or process. For example, in an automotive environment, a speech interface is sometimes provided as a less distracting way by which a user can interact with a car head unit and/or surrounding mobile devices.

Most speech interfaces include a speech recognition engine that operates to recognize words spoken by a user. A speech recognition engine typically employs two models for performing this function: an acoustic model, which is a statistical representation of the individual sound units that make up words (e.g., phonemes), and a language model, which models the properties of a language and tries to predict the next word in a speech sequence. Speech recognition engines may be prone to misrecognition, wherein misrecognition may include the failure to recognize a word as well as the recognition of the wrong word. Such misrecognition may occur due to acoustical differences between individuals as well as the presence of noise in the usage environment. Such misrecognition may also occur due to poor coverage by the language model such that the speech recognition engine is not expecting what a user says. Misrecognition may further be due to the inability of the speech recognition engine to generate a correct acoustic representation of a word because of an unusual way that it is being pronounced. By way of example, unusual pronunciations may be encountered when dealing with certain foreign contact names, media artist names, and media track names.

Conventional solutions for reducing the misrecognition rate of a speech recognition engine include both static and dynamic speaker adaptation. In accordance with static speaker adaptation, a user reads a number of preset phrases while in a normal usage environment, and a speaker adaptation algorithm is applied to extract the phonetic characteristics of the user and apply them to the acoustic model. In accordance with dynamic speaker adaptation, such acoustic model adaptation is performed "on the fly" as the user uses the speech interface based on the acceptance and rejection behavior of the user. Both of these solutions can lead to an overall increase of recognition accuracy. However, while a general increase of accuracy can be obtained, the speech recognition engine may still have difficulty understanding certain words that have specific and unusual pronunciations, such as proper names.

One conventional speaker-dependent solution for ensuring a higher recognition rate for uniquely-pronounced words involves the use of voice tags. For example, voice tags have been employed to perform contact dialing on mobile phones. In particular, some mobile phones allow a user to generate a voice tag by creating multiple recordings of a spoken word or words and associating the recordings with a particular contact name and telephone number. Then, to dial the telephone number associated with the contact name, the user need only repeat the word(s) in the voice tag. Typically, such a solution allows for only a limited number of recordings due to the storage limitations of the mobile phone. Such a solution can also be burdensome for the user, since he or she will have to record a voice tag for each contact.

Another conventional solution for ensuring a higher recognition rate for uniquely-pronounced words involves the use of a custom lexicon. A custom lexicon provides an association between words and their phonetic sequences. At software build time, a developer can identify a list of words that he/she wishes to add to the custom lexicon, and provide the proper phonetic descriptions for each of them. At software runtime, if the speech recognition engine determines that a phonetic description of a speech signal obtained from a user matches a phonetic description stored in the custom lexicon, then it will recognize the word associated with the matching phonetic description in the custom lexicon. Thus, by providing the custom pronunciations beforehand, the developer can ensure that the speech recognition engine will recognize certain uniquely-pronounced words. However, there are always going to be new uniquely-pronounced words that become popular. While a developer can provide ongoing updates to the custom lexicon, this requires significant work by the development team to regularly identify important uniquely-pronounced words as they become popular.

Another conventional solution for dealing with out-of-vocabulary words is mentioned in U.S. Pat. No. 7,676,365 to Hwang et al., entitled "Method and Apparatus for Constructing and Using Syllable-Like Unit Language Models." As described in that reference, a speech signal is decoded into syllable-like units (SLUs) which include more contextual information than phonemes. As further described in that reference, to add a new word to a custom user lexicon, a user must manually type a text representation of the word into an edit box of a user interface, and then pronounce the word into a microphone. An update unit receives the text of the new word and an SLU feature vector associated therewith from a decoding process, and uses both to update the custom user lexicon. A significant drawback to this approach is the cumbersome training interface, which requires the user to manually type in each new word and then pronounce it. If the number of new words to be added is large, this process can become unduly burdensome for the user. Furthermore, where the speech interface is being used with certain embedded devices, an interface for typing in words may be difficult to use or simply unavailable. Finally, such training must be initiated by the user outside of the context of normal usage of the speech interface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

Systems and methods are described herein for updating a custom lexicon used by a speech recognition engine that comprises part of a speech interface. In accordance with various embodiments described herein, a user is allowed to create an entry in the custom lexicon through speech and corrective interaction with the speech interface at runtime, as opposed to populating the custom lexicon during application development. The speech recognition engine uses the custom lexicon to override a default acoustic modeling scheme used thereby, when such a correction is necessary to achieve recognition.

Unlike the system described in the aforementioned U.S. Pat. No. 7,676,365, in which a user can only add a word to a custom lexicon during a training mode and in which the user must manually type the word into a user interface and then pronounce the word, embodiments described herein enable a user to add entries to a custom lexicon via an interactive corrective mechanism that may be presented to the user during normal usage of the speech interface. In accordance with certain embodiments, this is achieved as follows. First, a speech signal is obtained by the speech interface when the user speaks a name of a particular item for the purpose of selecting the particular item from among a finite set of items (e.g., a contact from a contact list, a media track from a media track list, a voice command from a finite list of voice commands, or the like). If it is determined that a phonetic description of the speech signal is not recognized by a speech recognition engine that forms a part of the speech interface, then the user is presented with a means for selecting the particular item from among the finite set of items by providing input in a manner that does not include speaking the name of the item. After the user has selected the particular item via the means for selecting, the phonetic description of the speech signal is stored in association with a text description of the particular item in a custom lexicon. Thus, the custom lexicon is updated with the new pronunciation automatically in response to the user selection. In further accordance with such embodiments, the next time the user speaks the word or words associated with the particular item, the speech recognition engine will have a much improved chance of recognizing the word(s) by referencing the phonetic descriptions stored in the updated custom lexicon.

In a case where there is a moderate difference between the user's pronunciation and the pronunciations stored in the lexicon(s) used by the speech recognition engine, the speech recognition engine may still be able to recognize the phonetic description of the speech signal but with a low level of confidence. In accordance with a further embodiment, in such a case, the system can automatically add the new pronunciation to the custom lexicon dictionary without requiring the user to interact with the corrective mechanism. Thus, this alternate embodiment also updates the custom lexicon automatically during a user's normal usage of the speech interface.

The approaches described herein for automatically updating a custom lexicon based on a user's selection of intent as described herein is particularly useful for implementing speech interfaces for embedded devices. In part, this is because such devices may not provide or otherwise support a keyboard-based training interface such as that described in the aforementioned U.S. Pat. No. 7,676,365.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
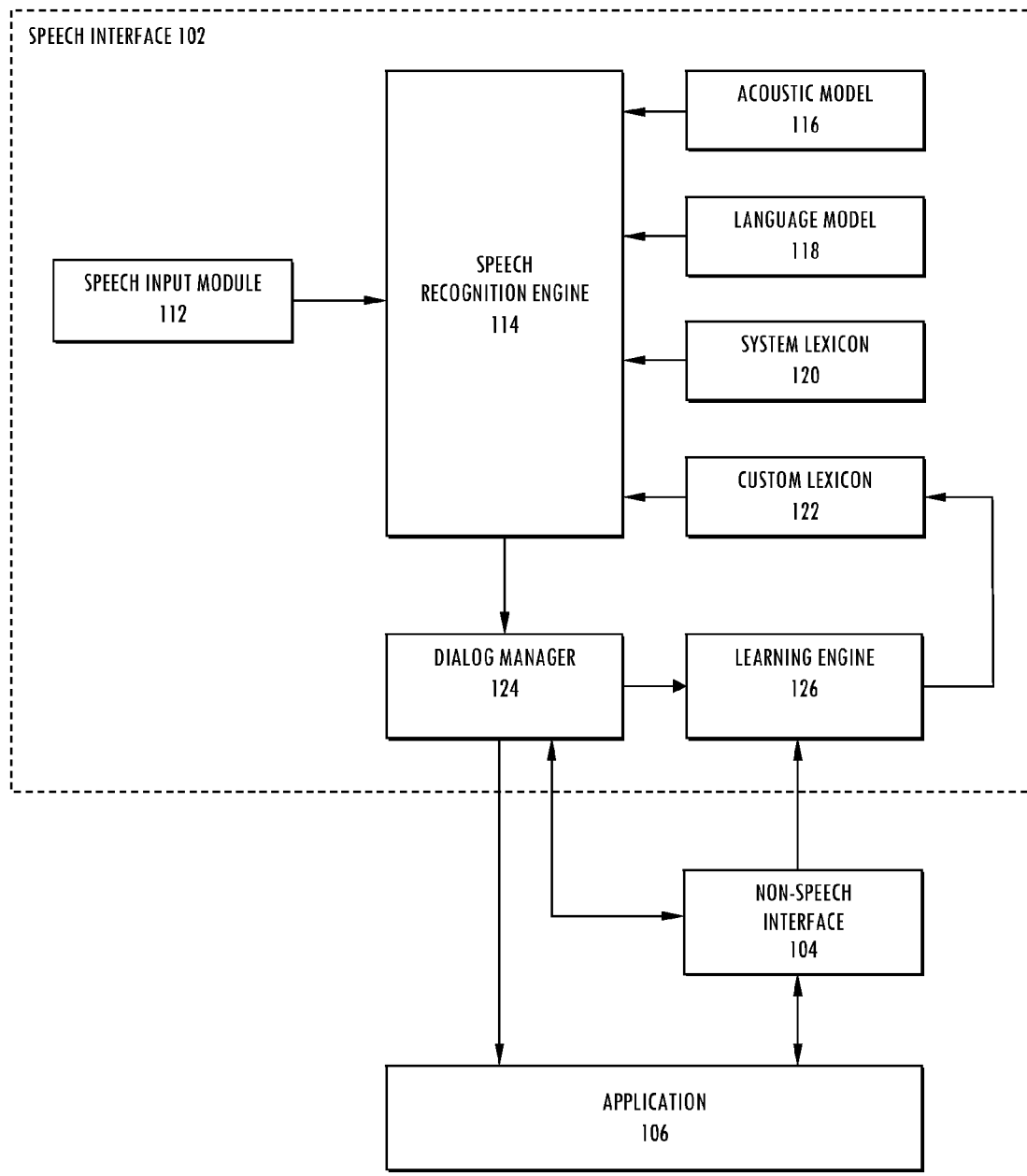
FIG. 1 is a block diagram of an example system that implements a method for updating a custom lexicon used by a speech recognition engine that comprises part of a speech interface in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Systems and methods are described herein for updating a custom lexicon used by a speech recognition engine that comprises part of a speech interface. In accordance with various embodiments described herein, a user is allowed to create an entry in the custom lexicon through speech and corrective interaction with the speech interface at runtime, as opposed to populating the custom lexicon during application development. The speech recognition engine uses the custom lexicon to override a default acoustic modeling scheme used thereby, when such a correction is necessary to achieve recognition.

Unlike the system described in the aforementioned U.S. Pat. No. 7,676,365, in which a user can only add a word to a custom lexicon during a training mode and in which the user must manually type the word into a user interface and then pronounce the word, embodiments described herein enable a user to add entries to a custom lexicon via an interactive corrective mechanism that may be presented to the user during normal usage of the speech interface. The approach to updating a custom lexicon based on a user's selection of intent as described herein is particularly useful for implementing speech interfaces for embedded devices. In part, this is because such devices may not provide or otherwise support a keyboard-based training interface such as that described in the aforementioned U.S. Pat. No. 7,676,365.

As will be discussed herein, the new entries in the custom lexicon may be made available to speech interfaces other than the speech interface that was used to generate such entries, thereby improving the speech recognition function of such other speech interfaces. This may be achieved, for example, by making the custom lexicon available to multiple devices over a network or by pushing new entries to multiple distributed custom lexicons.

As will also be discussed herein, the speech interface may allow a user to store multiple phonetic descriptions in association with a single text description of an item in the custom lexicon, thereby increasing the chance that the spoken word(s) associated with the item will be successfully recognized by the speech recognition engine. However, the speech interface may also maintain a limit on the total number of custom pronunciations that a user can enter for an item to ensure that a language model used by the speech recognition engine will not become polluted.

In accordance with further embodiments described herein, custom pronunciations may be stored in a user-specific custom lexicon that is used to recognize speech of the user only or in a system custom lexicon that is used to recognize speech of all users of a system. The speech interface may determine whether to store a particular custom pronunciation as a user-specific custom pronunciation or as a system custom pronunciation based on a variety of factors as will be discussed herein.

In accordance with still further embodiments described herein, entries in a first custom lexicon associated with a first user may also be added to a second custom lexicon associated with a second user, thereby allowing a specific user's lexicon to be modified with a non-null subset of the custom pronunciations of another user.

As will also be discussed herein, in accordance with an embodiment, prompting the user to select a particular item from among a finite set of items as part of the corrective mechanism may include applying a syllable-based statistical language model to the misrecognized speech signal to identify syllables present in the speech signal, identifying a subset of the items in the finite set of items in a classifier based on the identified syllables, and presenting the subset of the items to the user as candidates for selection via the non-speech interface. In further accordance with such an embodiment, a classification model used by the classifier may be updated based on the selection by the user of the particular item via the non-speech interface.

II. Example System for Updating a Custom Lexicon

FIG. 1 is a block diagram of an example system 100 that implements a method for updating a custom lexicon used by a speech recognition engine that comprises part of a speech interface in accordance with an embodiment. As shown in FIG. 1, system 100 includes a speech interface 102, a non-speech interface 104 and an application 106. Speech interface 102 is a user interface that is designed to enable a user to interact with application 106 using his or her voice. In one embodiment, speech interface 102 comprises part of an interactive voice response (IVR) system, although this example is not intended to be limiting.

Non-speech interface 104 is a user interface with which a user may interact via a means other than his or her voice. In certain embodiments, non-speech interface 104 may be used to carry out part of a corrective process that is invoked when a speech recognition engine 114 within speech interface 102 fails to recognize one or more words spoken by the user, as will be described in more detail herein. In accordance with further embodiments, a user may also interact with non-speech interface 104 to invoke or interact with certain elements of application 106. Depending upon the implementation, non-speech interface 104 may include one or more of a touch screen, a keyboard, a keypad, a mouse, a touch pad, a trackball, a joystick, a pointing stick, a wired glove, a motion tracking sensor, a game controller or gamepad, or a video capture device such as a camera. However, these examples are not intended to be limiting, and other types of non-speech interfaces may be used.

Application 106 is intended to broadly represent any apparatus, system, or automated process with which a user may interact using a speech interface such as speech interface 102. By way of example only and without limitation, application 106 may comprise a computer, a mobile telephone or other portable electronic device, a head set in an automobile, an automated teller machine (ATM), or the like. In certain embodiments, application 106 comprises an embedded device. Application 106 may also represent software that is executed by one or more processors in a well-known manner. By way of example only and without limitation, application 106 may comprise a software application such as a telephony application or other communication application (e.g., e-mail, instant messaging, or the like), a navigation application, a media player, an Internet browser, a word processor, or the like.

Speech interface 102 will now be described in more detail. As further shown in FIG. 1, speech interface 102 includes a number of components including a speech input module 112, a speech recognition engine 114, an acoustic model 116, a language model 118, a system lexicon 120, a custom lexicon 122, a dialog manager 124 and a learning engine 126.

Speech input module 112 is configured to capture one or more words spoken by a user of speech interface 102 and convert the captured word(s) into a speech signal that is then passed to speech recognition engine 114. In one embodiment, speech input module 112 comprises a microphone that captures words(s) spoken by a user and converts them into an analog speech signal and an analog-to-digital (A/D)

converter that converts the analog speech signal into a digital speech signal that is then passed to speech recognition engine 114. As will be appreciated by persons skilled in the relevant art(s), speech input module 112 may also comprise an array of microphones (and associated A/D converters) that are used to generate the speech signal passed to speech recognition engine 114 and/or additional components that can be used to improve the quality of the speech signal, such as acoustic beamforming logic, echo cancellation logic, or the like.

Speech recognition engine 114 is configured to process the speech signal received from speech input module 112 to identify a most likely word or sequence of words represented by the speech signal. In one embodiment, speech recognition engine 114 performs this process by grouping digital samples of the speech signal into a series of fixed-length frames and then performing feature extraction on each frame in the series to generate a single multi-dimensional feature vector per frame. As will be appreciated by persons skilled in the art, performing feature extraction may include but is not limited to performing one or more of Linear Predictive Coding (LPC), LPC derived cepstrum, Perceptive Linear Prediction (PLP), auditory model feature extraction and Mel-Frequency Cepstrum Coefficients (MFCC) feature extraction. In further accordance with such an embodiment, speech recognition engine 114 then identifies a most likely word or sequence of words based on the stream of feature vectors produced by the feature extraction process, acoustic model 116, language model 118, system lexicon dictionary 120 and custom lexicon dictionary 122.

Acoustic model 116 provides a statistical representation of the individual sound units that make up words. In one embodiment, acoustic model 116 comprises a Hidden Markov Model consisting of a set of hidden states, with one state per frame of the input speech signal. Each state has an associated set of probability distributions that describe the likelihood of an input feature vector matching a particular state. In certain embodiments, a mixture of probabilities is associated with each state. The model may also include probabilities for transitioning between two neighboring model states as well as allowed transitions between states for particular linguistic units. The size of the linguistic units may vary depending upon the implementation. For example, the linguistic units may be senones, phonemes, diphones, triphones, syllables or even whole words.

Language model 118 provides a set of likelihoods that a particular sequence of linguistic units will appear in a particular language. In certain embodiments, the language model may be based on a text database such as the North American Business News (NAB), which is described in greater detail in a publication entitled CSR-III, Text Language Model, University of Pennsylvania, 1994. Language model 118 may be a context-free grammar, a statistical N-gram model such as a trigram, or a combination of both. In one embodiment, language model 118 is a compact trigram model that determines the probability of a sequence of words based on the combined probability of three-word segments of the sequence.

In a further embodiment, speech recognition engine 114 utilizes a language model based on syllable-like units (SLUs) to perform the speech recognition function, wherein the SLUs are generally larger than a single phoneme but smaller than a word. As SLUs are longer than phonemes, they contain more acoustic contextual clues and better lexical constraints for speech recognition. Such a language model is described in U.S. Pat. No. 7,676,365 to Hwang et al., the entirety of which is incorporated by reference herein.

System lexicon 120 comprises a list of linguistic units (typically words or syllables) that are valid for a particular language. Speech recognition engine 114 uses system lexicon 120 to limit its search for possible linguistic units to those that are actually part of the language. System lexicon 120 also contains pronunciation information in the form of mappings from each linguistic unit to a sequence of acoustic units used by acoustic model 116. Each sequence of acoustic units may be thought of as a phonetic description of the linguistic unit to which it is mapped.

Custom lexicon 122 is similar to system lexicon 120, except that custom lexicon 122 contains linguistic units that have been added via some runtime interaction with a user of speech interface 102 while system lexicon 120 typically includes linguistic units that were originally provided as part of speech interface 102. For example, as will be discussed in more detail herein, system 100 enables a user to add linguistic units, such as words, to custom lexicon 122 through speech and corrective interaction with speech interface 102 at runtime. It is noted that custom lexicon 122 may utilize a language model having a different structure than that used by language model 118. For example, language model 118 may comprise a trigram model while custom lexicon 122 may utilize context-free phonemes.

Once speech recognition engine 114 has utilized the stream of feature vectors, acoustic model 116, language model 118, system lexicon dictionary 120 and custom lexicon dictionary 122 to identify a most likely word or sequence of words that corresponds to the speech signal received from speech input module 112, it outputs the identified word(s) to dialog manager 124.

Dialog manager 124 is configured to guide the interaction between the user and speech interface 102 so that appropriate input can be generated for application 106. Among other functions, dialog manager 124 may operate to indicate to the user that speech interface 102 is operational, to prompt the user of speech interface 102 to provide information by speaking, wherein such information may include but is not limited to a voice command relevant to application 106, a vocal indication of an option to be selected from among a number of options included in a menu presented by application 106 or some other item to be selected from among a finite set of items made available by application 106, to prompt the user to repeat a word or words when such word(s) are not recognized by speech recognition engine 114, or the like. Dialog manager may thus utilize the word(s) output by speech recognition engine 114 to invoke automated features and functionality of application 106.

As noted above, to perform its function, dialog manager may accept input via speech interface 102. To perform its function, dialog manager 124 may also accept input via a non-speech interface, such as non-speech interface 104. This may occur, for example, when a feature or function of application 106 can only be invoked via non-speech interface 104. This may also occur when speech recognition engine 114 misrecognizes a word or words and dialog manager 124 invokes a corrective process that will be described in the following section. Generally speaking, in accordance with this corrective process, the user provides input via speech interface 102 or non-speech interface 104 that indicates which item in a finite list of items the user intended to select when providing misrecognized speech input to speech interface 102, wherein such input does not include repeating the misrecognized word(s). Learning engine 126 is configured to associate the selected item with a phonetic description of the item generated by speech recognition engine 114 and to store the associated information in custom lexicon 122, thereby updating custom lexicon 122 automatically as part of the corrective process.

Although not shown in FIG. 1, speech interface 102 may further include a text-to-speech (TTS) engine and one or more speakers. Speech interface 102 may utilize such components to generate spoken prompts or otherwise provide information in the form of synthesized speech to a user of the speech interface. Learning engine 126 may also use such components to enable a user to confirm a pronunciation to be stored in custom lexicon 122.

In accordance with certain implementations, each of the components of system 100 is implemented as an integrated part of a single device. In accordance with alternate implementations, various components of system 100 are implemented as part of separate devices that are communicatively connected to one another. For example, speech interface 102 and non-speech interface 104 may each be implemented as part of a device that is local to a user and application 106 may be implemented on a device that is remote to the user but connected to the local device via one or more wired and/or wireless links or networks. As another example, only speech input module 112 may be implemented as a part of a device that is local to a user and all of the other components of system 100 may be implemented a remote device or multiple interconnected remote devices that are communicatively connected to the local device. Still other implementations are possible.

III. Example Method for Updating a Custom Lexicon

Figure 2:
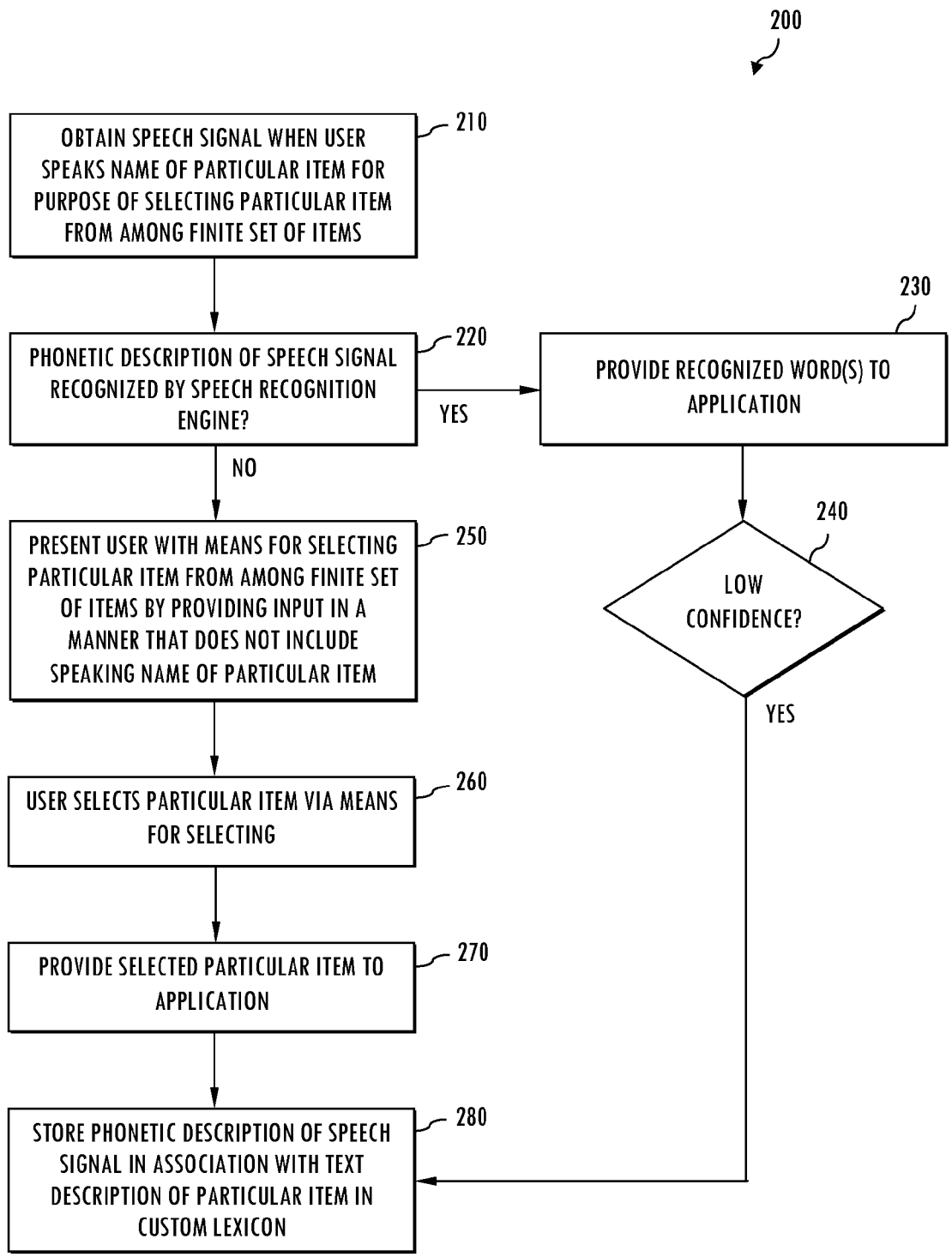
FIG. 2 depicts a flowchart of a method for updating a custom lexicon used by a speech recognition engine that comprises part of a speech interface in accordance with an embodiment.

FIG. 2 depicts a flowchart 200 of a method for updating a custom lexicon used by a speech recognition engine that comprises part of a speech interface in accordance with an embodiment. The method of flowchart 200 will now be described with continued reference to various elements of system 100 of FIG. 1. However, the method of flowchart 200 is not limited to that implementation and may be carried out using other elements or systems entirely.

The method of flowchart 200 begins at step 210 in which speech recognition engine 114 obtains a speech signal when a user speaks a name of a particular item into speech interface 102 for the purpose of selecting the particular item from among a finite set of items. A variety of speech interfaces and applications exist that require a user to select an item from among a finite set of items. For example, a user may wish to select a voice command from among a limited set of voice commands that are recognizable to speech interface 102 and/or application 106. As further examples, a user may wish to select a contact from a list of personal and/or professional contacts, select an album or track from a list of musical albums or tracks, select an address from among a plurality of addresses, select a website from among a list of favorite websites, select an application from among a list of available applications, selecting a document or file from among a list of available documents or files, or the like.

At decision step 220, speech recognition engine 114 generates a phonetic description of the speech signal and determines whether or not such phonetic description is recognized (e.g., whether the phonetic description matches a phonetic description stored in association with a textual description of a word or other linguistic unit in either system lexicon 120 or custom lexicon 122).

As shown at step 230, if speech recognition engine 114 recognizes the phonetic description of the speech signal, then dialog manager 124 will pass the recognized word or words to application 106 and application 106 will utilize the recognized word(s) to select the particular item from among the finite set of items. Application 106 may further perform a desired function based on the selection.

At decision step 240, it is determined if speech recognition engine 114 recognized the phonetic description of the speech signal with only a low level of confidence. For example, it may be determined that a measure of confidence with which the phonetic description of the speech signal has been recognized by the speech recognition engine is below a predefined threshold In such a case, learning engine 126 stores the phonetic description of the speech signal in association with a text description of the particular item in custom lexicon 122 as shown at step 280. Thus, custom lexicon 122 is updated to facilitate future recognition of the problematic pronunciation.

As shown at step 250, if speech recognition engine 114 fails to recognize the phonetic description of the speech signal, then dialog manager 124 presents the user with a means for selecting the particular item from among the finite set of items by providing input in a manner that does not include speaking the name of the particular item. It should be noted that failure to recognize the phonetic description of the speech signal may encompass both the failure of speech recognition engine 114 to match the phonetic description of the speech signal to any word(s) stored in system lexicon 120 or custom lexicon 122 as well as speech recognition engine 114 matching the phonetic description of the speech signal to the wrong word(s). In the latter case, the user may be required to provide some input indicating that the wrong word(s) were recognized by speech recognition engine 114 in order to notify dialog manager 124 that a misrecognition has occurred.

As part of step 250, dialog manager 124 may generate a prompt the user to make the selection via the means for selection. Such a prompt may comprise an audible voice prompt or a non-voice prompt. The prompt may be delivered via speech interface 102, non-speech interface 104 or some other interface. Alternatively, no prompt may be generated.

In one embodiment, the means for selecting the particular item from among a list of items comprises a visual presentation of the list of items on display element of non-speech interface 104. In this case, the selection may be carried out using a touch screen, a mouse, a touch pad, or the like, depending upon the input means provided by non-speech interface 104. Still other non-speech interfaces may be used to make the desired selection.

In another embodiment, the means for selecting the particular item from among the list of items comprises voice commands or other speech input that can be recognized by a speech interface, such as speech interface 102, wherein such speech input does not include simply repeating the misrecognized name. For example, a user could use voice commands to navigate to a desired contact presented in a contact list on a display. By way of providing a particular example, a user may say "call Mom," which is not recognized by speech recognition engine 114. Then, the user could say "open contacts," "go to M," "down," "down" and "call" to select Mom from a finite list of available contacts. Still other types of speech input may be used for selecting the particular item wherein such speech input does not include simply repeating the misrecognized name.

The foregoing examples of the means for selecting the particular item from among the list of items are not intended to be limiting. The means for selecting may comprise any means for capturing a gesture of intent made by a user, At step 260, the user selects the particular item via the means for selecting presented in step 250 and at step 270 the selected particular item is provided to application 106 so that application 106 can perform a desired function based on the selection.

At step 280, learning engine 126 stores the phonetic description of the speech signal produced by speech recognition engine 114 in association with a text description of the particular item in custom lexicon 122. As a result of this step, the next time the user speaks the word or words associated with the particular item, speech recognition engine 114 will have an improved chance of recognizing the word(s) by referencing the phonetic descriptions stored in the updated custom lexicon.

An example use case will now be described to demonstrate at least one application of flowchart 200. This use case is provided by way of example only and is not intended to be limiting. In accordance with this use case, application 106 comprises a media player that stores music tracks associated with a finite set of artists. The media player can also play selected music tracks in response to user input comprising a "play artist" command followed by the name of an artist.

To initiate playback by the media player, a user says the words "play artist Tupac." However, the text description of the artist name stored by the media player is actually the stylized name "2Pac." During step 210, a speech signal corresponding to the spoken words is obtained by speech recognition engine 114. In this case, the particular item to be selected from among the finite set of items is the artist 2Pac from among the finite set of artists having music tracks that can be played by the media player.

For the purposes of this example use case, neither system lexicon 120 nor custom lexicon 122 includes a pronunciation corresponding to the stylized name "2Pac." Furthermore, neither lexicon stores a pronunciation similar to the spoken word "Tupac." Consequently, speech recognition engine 114 will fail to recognize the word "Tupac" spoken by the user. In accordance with flowchart 200, this means that dialog manager 124 will present the user at step 250 with a means for selecting the artist from among a finite list of artists. For example, based on a high confidence of the hypothesis of "play artist," dialog manager 124 may prompt the user by stating "I heard 'play artist,' but I couldn't recognize the artist name. Can you please select it?" A display portion of non-speech interface 104 may then be caused to present a list of artists which the user can browse and from which the user can select "2Pac" using a suitable user input device (e.g., a touch screen). Alternatively, unique numbers may be placed next to a number of candidate items and the user could say one of the numbers to select the desired item.

In accordance with step 280, after the user has selected "2Pac" from the list of artists in step 260, learning engine 126 stores the pronunciation "Tupac" in association with the stylized name "2Pac" in custom lexicon 122. As a result of this step, the next time the user says the words "play artist Tupac," speech recognition engine 114 will have a much improved chance of properly understanding the command by referencing the phonetic descriptions stored in the updated custom lexicon.

IV. Example System and Method Extensions

In accordance with one embodiment, the above-described method for updating a custom lexicon is selectively performed by system 100 based upon the context in which the system is being used. For example, in an embodiment in which system 100 is implemented in an automotive environment, the corrective process may only be performed when an automobile that includes speech interface 102 is parked. This advantageously ensures that the user will not be distracted from driving while participating in the corrective process. Then, when the user is subsequently driving the automobile, the updated custom lexicon can be used.

In accordance with a further embodiment, the user may perform the corrective process while interacting with a first device and the resulting updates to the custom lexicon may be shared with other devices. Thus, for example, a user may perform the corrective process while interacting with a personal computer and the resulting updates to the custom lexicon may be shared with a speech interface of a device used in an automotive environment.

Figure 3:
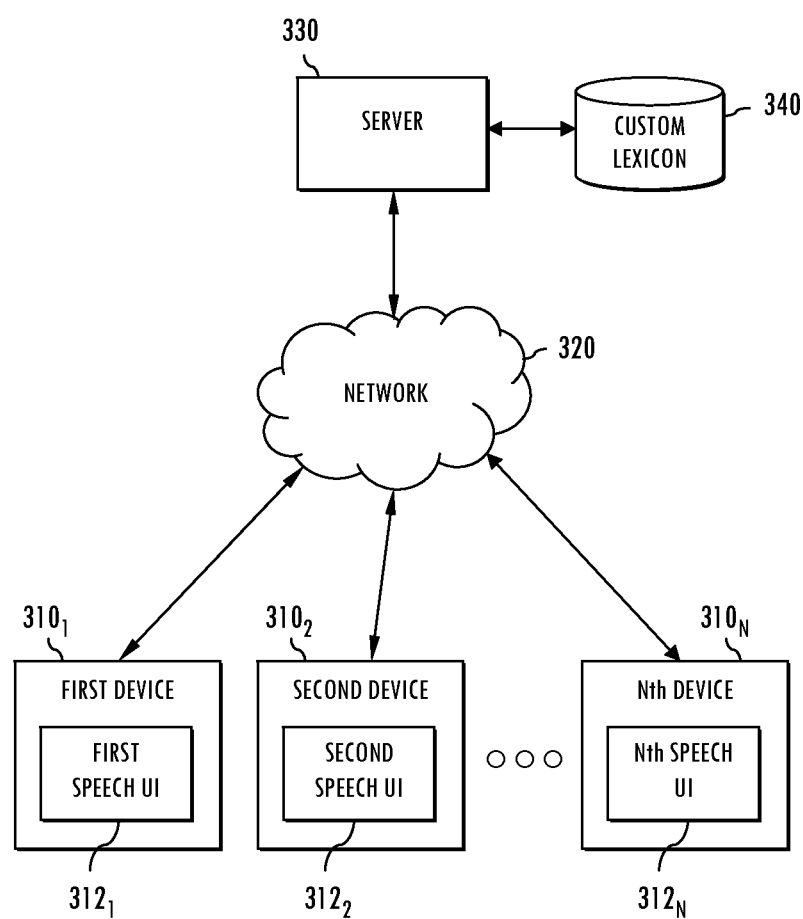
FIG. 3 is a block diagram of a system that utilizes a first approach to sharing custom lexicon updates in accordance with an embodiment.

FIG. 3 is a block diagram of a system 300 that utilizes a first approach to sharing custom lexicon updates in accordance with an embodiment. As shown in FIG. 3, system 300 includes N devices, denoted devices $310_1$-$310_N$, each of which may be communicatively connected to a network 320. Each device $310_1$-$310_N$ includes a corresponding speech interface $312_1$-$312_N$, which may be implemented in a like manner to speech interface 102 described above in reference to FIG. 1. However, in system 300, each device $310_1$-$310_N$ shares the same custom lexicon 340, which is accessed via network 320. In particular, a server 330 that is communicatively connected to network 320 manages accesses by each of devices $310_1$-$310_N$ to custom lexicon 340. Furthermore, in system 300, one or more of devices $310_1$-$310_N$ is capable of performing a method for updating a custom lexicon such as was described above in reference to flowchart 200 of FIG. 2. Thus, for example, if first device $310_1$ is capable of generating a new entry for inclusion in custom lexicon 340 using the method of flowchart 200, first device $310_1$ can pass the new entry to server 330, which will add the new entry to custom lexicon 340. After the addition, the new entry will be available to all of devices $310_1$-$310_N$ by virtue of the fact that they share custom lexicon 340. Thus, all the devices can achieve improved speech recognition due to the performance of the corrective method by a single device.

Figure 4:
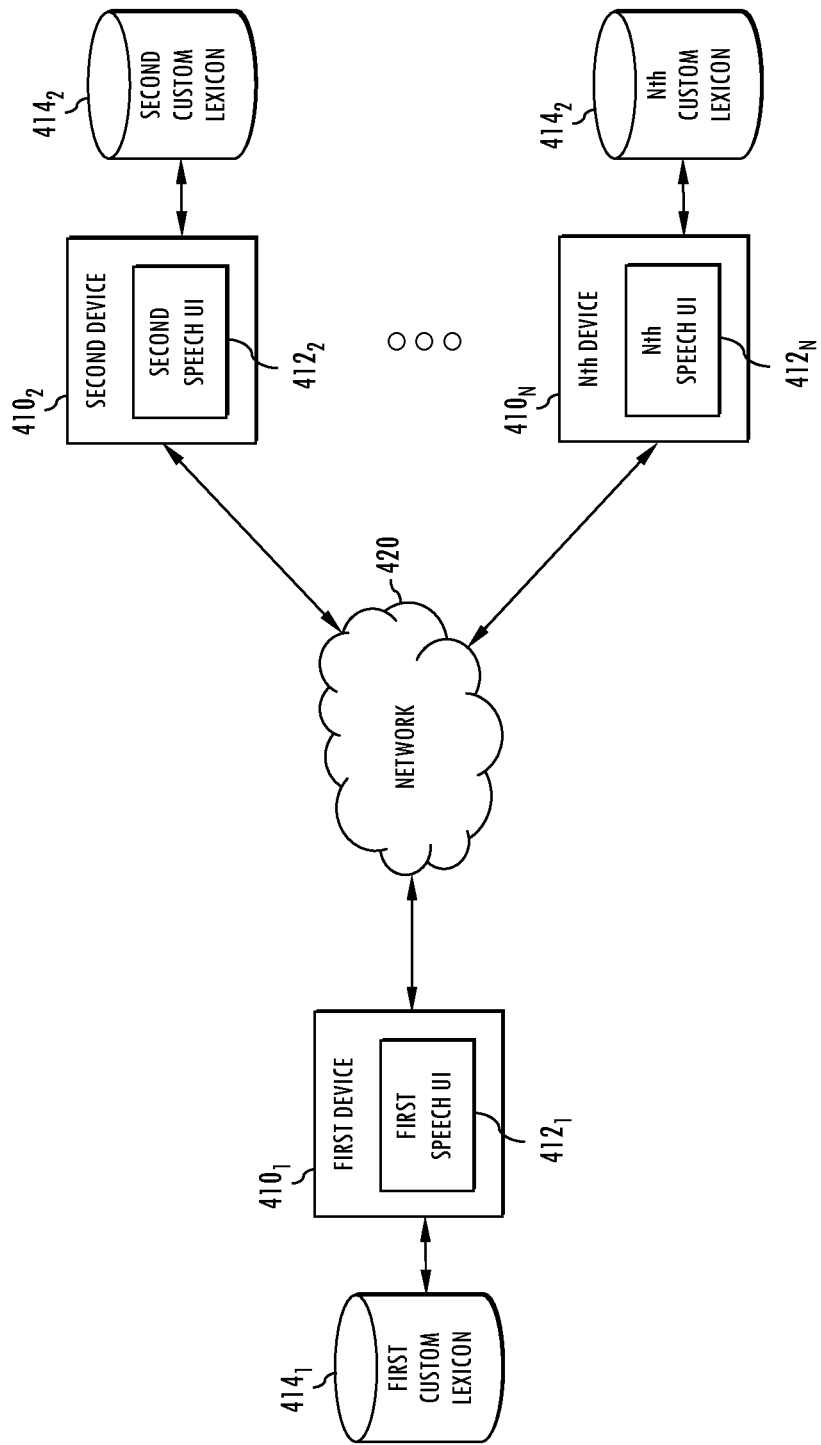
FIG. 4 is a block diagram of a system that utilizes a second approach to sharing custom lexicon updates in accordance with an embodiment.

FIG. 4 is a block diagram of a system 400 that utilizes a second approach to sharing custom lexicon updates in accordance with an embodiment. As shown in FIG. 4, system 400 includes N devices, denoted devices $410_1$-$410_N$, each of which is communicatively connected to a network 420. Each device $410_1$-$410_N$ includes a corresponding speech interface $412_1$-$412_N$, which may be implemented in a like manner to speech interface 102 described above in reference to FIG. 1. Furthermore, in system 400, one or more of devices $410_1$-$410_N$ is capable of performing a method for updating a custom lexicon such as was described above in reference to flowchart 200 of FIG. 2 and then transmitting new custom lexicon entries to the other devices for inclusion in their respective custom dictionaries. Thus, for example, if first device $410_1$ is capable of generating a new entry for inclusion in custom lexicon $414_1$ using the method of flowchart 200, first device $410_1$ can both update its own custom lexicon $414_1$ as well as pass the new entry to second device $410_2$ and Nth device $410_N$, so that those devices can update their respect custom lexicons as well. In this way, the new entry will be available to all of devices $410_1$-$410_N$. Thus, all the devices can achieve improved speech recognition due to the performance of the corrective method by a single device.

The foregoing example approaches for sharing custom lexicon updates described in reference to FIGS. 3 and 4 are provided by way of example only and are not intended to be limiting. Persons skilled in the relevant art(s) will appreciate that still other methods and approaches to sharing custom lexicon updates may be used.

In another embodiment, speech interface 102 allows a user to store multiple phonetic descriptions in association with a single text description of an item in custom lexicon 122, thereby increasing the chance that the spoken word(s)

associated with the item will be successfully recognized by speech recognition engine 114. However, speech interface 102 may also maintain a limit on the total number of custom pronunciations that a user can associate with a given text description of an item to ensure that a language model used by speech recognition engine 114 will not become polluted.

Figure 5:
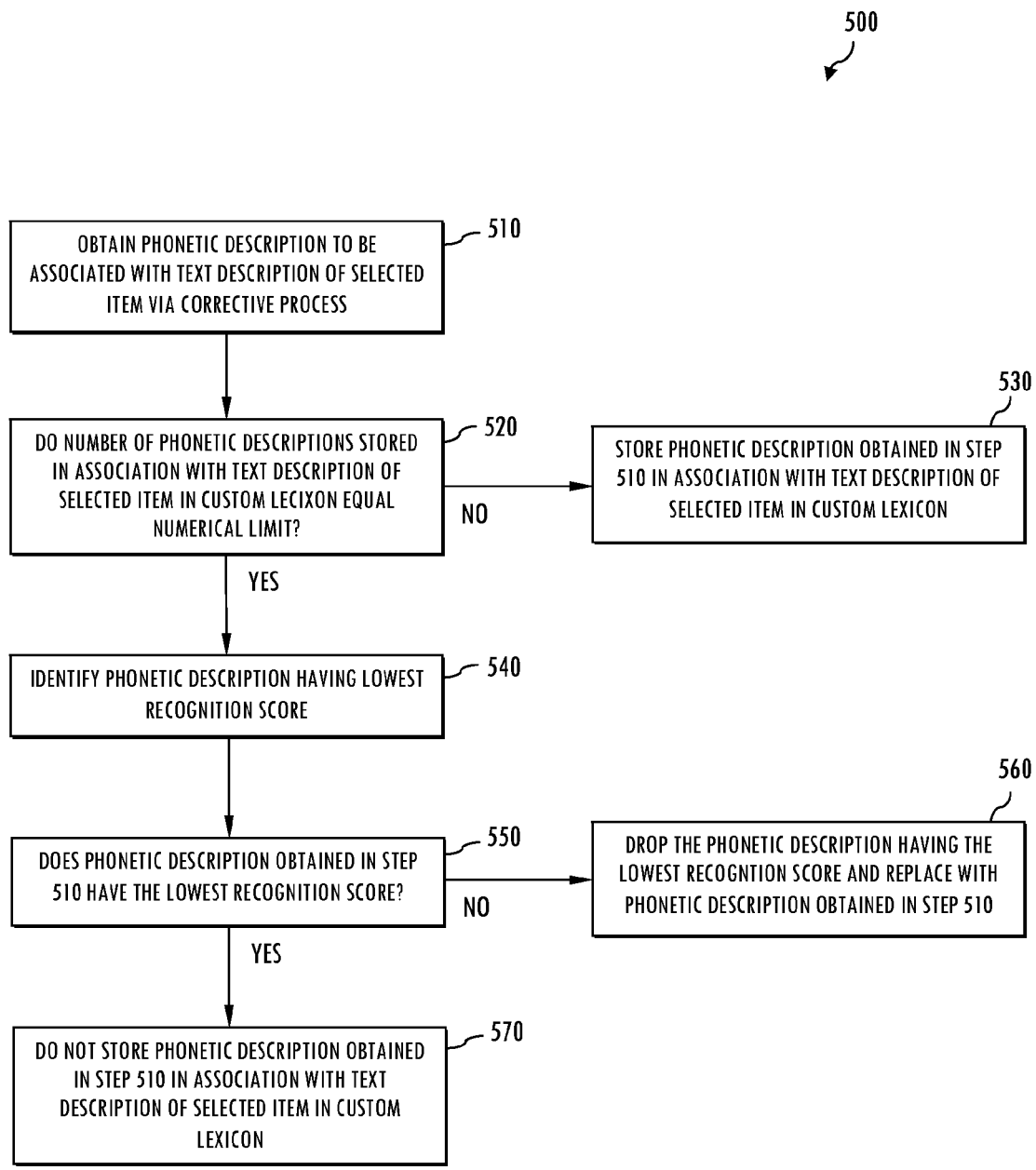
FIG. 5 depicts a flowchart of one method for updating a custom lexicon in accordance with an embodiment that limits the total number of pronunciations that may be associated with a given text description of an item.

FIG. 5 depicts a flowchart 500 of one method for updating a custom lexicon in accordance with an embodiment that limits the total number of pronunciations that may be associated with a given text description of an item in the custom lexicon. The method of flowchart 500 will now be described with continued reference to various elements of system 100 of FIG. 1. However, the method of flowchart 500 is not limited to that implementation and may be carried out using other elements or systems entirely.

As shown in FIG. 5, the method of flowchart 500 begins at step 510, in which a phonetic description is obtained that is to be associated with a text description of an item selected by a user via a corrective process. For example, this step may be achieved by carrying out the corrective process described above in regard to flowchart 200 of FIG. 2. In particular, as discussed in reference to step 280 of FIG. 2, after the user has selected a particular item via the means for selecting, learning engine 126 can attempt to store the phonetic description of the speech signal produced by speech recognition engine 114 in association with a text description of the particular item in custom lexicon 122.

At step 520, learning engine 126 determines if a number of phonetic descriptions stored in custom lexicon 122 in association with the text description of the selected item is equal to a numerical limit. If the number of phonetic descriptions stored in custom lexicon 122 in association with the text description of the selected item is not equal to the numerical limit (i.e., it is less than the numerical limit), then control flows to step 530, in which learning engine 126 stores the phonetic description obtained in step 510 in association with the text description of the selected item in custom lexicon 122.

However, if during step 520, learning engine 126 determines that the number of phonetic descriptions stored in custom lexicon 122 in association with the text description of the selected item is equal to the numerical limit, then control flows to step 540. During step 540, learning engine 126 identifies which of the phonetic descriptions associated with the text description of the selected item (including both the phonetic description obtained in step 510 and the phonetic descriptions already stored in custom lexicon 122) has a lowest recognition score assigned thereto by speech recognition engine 114. Such recognition score may represent a level of confidence with which speech recognition engine 114 has matched a given phonetic description to the text description of the selected item.

At step 550, learning engine 126 determines if the phonetic description obtained in step 510 is the phonetic description having the lowest recognition score. If the phonetic description obtained in step 510 is the phonetic description having the lowest recognition score, then the phonetic description obtained in step 510 is not stored in custom lexicon 122 in association with the text description of the selected item. This is shown at step 570.

However, if at step 550, learning engine 126 determines that the phonetic description obtained in step 510 is not the phonetic description having the lowest recognition score, then the phonetic description having the lowest recognition score is removed from custom lexicon 122 and the phonetic description obtained in step 510 is instead stored in custom lexicon 122 in association with the text description of the selected item. This is shown at step 560.

The example approach described in FIG. 5 for limiting the total number of pronunciations that may be associated with a given text description of an item in a custom lexicon is provided by way of example only and is not intended to be limiting. Persons skilled in the relevant art(s) will appreciate that still other methods and approaches may be used to achieve substantially the same end.

In a further embodiment, new pronunciations obtained via the method described above in reference to flowchart 200 may be selectively stored in either a user-specific custom lexicon that is used to recognize speech of the user only or in a system custom lexicon that is used to recognize speech of all users of a system. Learning engine 126 may determine whether to store a particular custom pronunciation as a user-specific custom pronunciation or as a system custom pronunciation based on a variety of factors.

Figure 6:
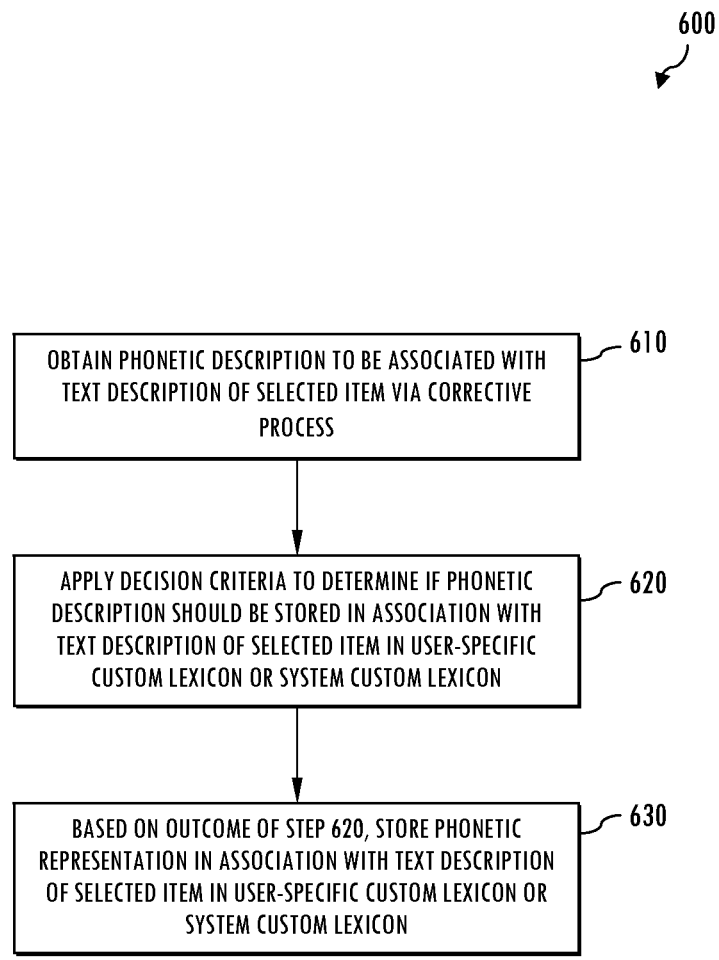
FIG. 6 depicts a flowchart of method for selectively storing a pronunciation in a user-specific custom lexicon or a system custom lexicon in accordance with an embodiment.

By way of example, FIG. 6 depicts a flowchart 600 of method for selectively storing a pronunciation in a user-specific custom lexicon or a system custom lexicon in accordance with an embodiment. The method of flowchart 600 will now be described with continued reference to various elements of system 100 of FIG. 1. However, the method of flowchart 600 is not limited to that implementation and may be carried out using other elements or systems entirely.

As shown in FIG. 6, the method of flowchart 600 begins at step 610, in which a phonetic description is obtained that is to be associated with a text description of an item selected by a user via a corrective process. For example, this step may be achieved by carrying out the corrective process described above in regard to flowchart 200 of FIG. 2. In particular, as discussed in reference to step 280 of FIG. 2, after the user has selected a particular item via the means for selecting, learning engine 126 can attempt to store the phonetic description of the speech signal produced by speech recognition engine 114 in association with a text description of the particular item in custom lexicon 122.

At step 620, learning engine 126 applies certain decision criteria to determine if the phonetic description obtained in step 610 should be stored in association with the text description of the selected item in a user-specific custom lexicon or a system custom lexicon. Various decision criteria may be used to make such a determination. For example, the decision criteria may relate to the type of item that was selected by the user. In accordance with one particular example, learning engine 126 may be configured to store new pronunciations associated with contact names in a user-specific custom lexicon since different users tend to pronounce names differently. However, learning engine 126 may be configured to place new pronunciations associated with an artist's name or the name of a song in a system custom dictionary, since misrecognition of those items have more to do with the fact that speech recognition engine 114 on its own cannot generate a good recognition for an unusually-pronounced artist's name (e.g., Beyonce) or track name than the fact that different users pronounce the names differently.

In an embodiment in which learning engine 126 can access multiple user-specific custom lexicons, if learning engine 126 determines that a certain number of user-specific custom lexicons all include a same or similar pronunciation for the selected item, then learning engine 126 can determine that such pronunciation should be elevated to a system custom lexicon, such that it will be used in recognizing speech of all users of the system.

In a further embodiment, learning engine 126 may present the user of speech interface 102 with the option to store the new pronunciation in a user-specific custom lexicon or a system custom lexicon, thereby letting the user choose which lexicon is most appropriate. Still other factors may be used to determine which lexicon should be chosen.

At step 630, based on the outcome of the application of the decision criteria in step 620, the phonetic description obtained in step 610 is stored in association with the text description of the selected item in either the user-specific custom lexicon or the system custom lexicon.

The example approach described in FIG. 6 for selectively storing a pronunciation in a user-specific custom lexicon or a system custom lexicon is provided by way of example only and is not intended to be limiting. Persons skilled in the relevant art(s) will appreciate that still other methods and approaches may be used to achieve substantially the same end.

In accordance another embodiment, entries in a first custom lexicon associated with a first user may also be added to a second custom lexicon associated with a second user, thereby allowing a specific user's lexicon to be modified with a non-null subset of the custom pronunciations of another user.

To help illustrate the benefit of such an embodiment, a particular use case will now be described. This use case is described herein by way of example only and is not intended to be limiting. In accordance with this use case, system 100 of FIG. 1 is implemented in an automobile owned by a family in which the husband and wife each have a similar dialect. By interacting with system 100 in the manner described above in reference to flowchart 200, the system adds the wife's pronunciations to a user-specific custom lexicon associated with the wife. Then the husband drives the automobile for the first time. While the husband is interacting with speech interface 102, speech recognition engine 114 fails to recognize a name or song title spoken by the husband. However, learning engine 126 determines that the pronunciation is very similar to the wife's pronunciation. Based on this determination, learning engine 126 imports the pronunciation from the wife's user-specific custom lexicon to the husband's user-specific custom lexicon and a flags a connection between the two lexicons. When speech recognition engine 114 fails to recognize another word spoken by the husband, it can again search for a suitable pronunciation in the wife's user-specific lexicon. Eventually, learning engine 126 can statistically identify the two users as having similar speaking patterns and will automatically import the wife's new pronunciations into the user-specific custom lexicon of the husband. In this way, the training provided by the wife can influence and improve the speech recognition function for the husband in a transparent manner.

In further accordance with this example use case, the husband and wife may have a child that has a different dialect. When this child drives the car, learning engine 126 will determine that the child's pronunciations are not similar to those of the husband and wife and thus will not import any of the husband and wife's pronunciations into the child's user-specific custom lexicon.

Figure 7:
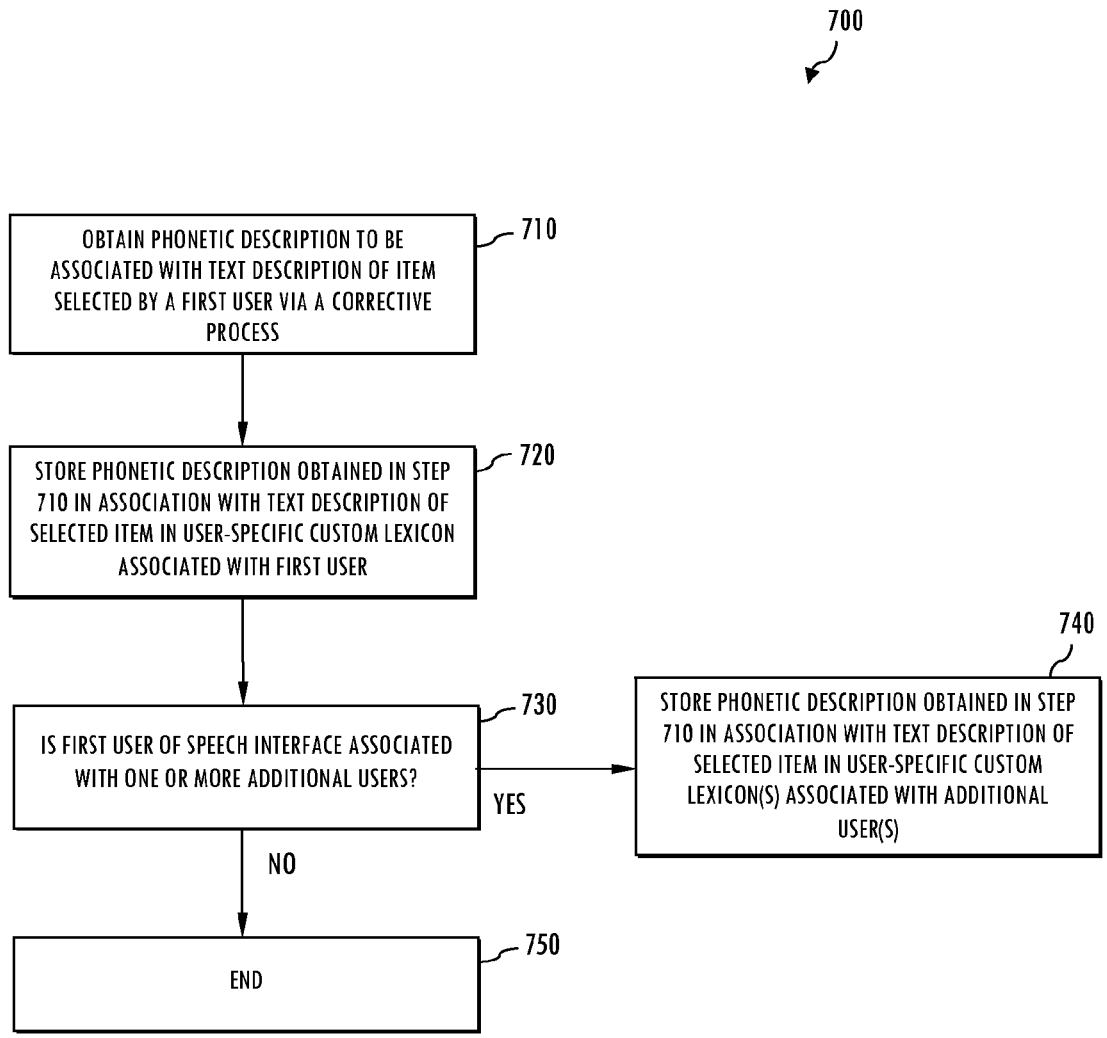
FIG. 7 depicts a flowchart of a method for importing new pronunciations from a user-specific custom lexicon of a first user to one or more user-specific custom lexicons of one or more additional users in accordance with an embodiment.

By way of further example, FIG. 7 depicts a flowchart 700 of a method for importing new pronunciations from a user-specific custom lexicon of a first user to one or more user-specific custom lexicons of one or more additional users in accordance with an embodiment. The method of flowchart 700 will now be described with continued reference to various elements of system 100 of FIG. 1. However, the method of flowchart 700 is not limited to that implementation and may be carried out using other elements or systems entirely.

As shown in FIG. 7, the method of flowchart 700 begins at step 710 in which a phonetic description is obtained that is to be associated with a text description of an item selected by a first user via a corrective process. For example, this step may be achieved by carrying out the corrective process described above in regard to flowchart 200 of FIG. 2. In particular, as discussed in reference to step 280 of FIG. 2, after the first user has selected a particular item via the means for selecting, learning engine 126 can attempt to store the phonetic description of the speech signal produced by speech recognition engine 114 in association with a text description of the particular item in custom lexicon 122.

At step 720, learning engine 126 stores the phonetic description obtained in step 710 in association with the text description of the selected item in a user-specific custom lexicon associated with the first user.

At step 730, learning engine 126 determines if the first user is associated with one or more additional users. This step may comprise, for example, determining that the first user pronounces words in a similar manner to the one or more additional users, or the like. This step may occur at any time, including when the first user is using speech interface 102, when any of the one or more additional users is using speech interface 102, or at some other time.

If it is determined at step 730 that the first user is not associated with the one or more additional users, then the process ends as shown at step 750. However, if it is determined at step 730 that the first user is associated with the one or more additional users, then learning engine 126 stores the phonetic description obtained in step 710 in association with the text description of the selected item in user-specific custom lexicon(s) associated with the additional user(s). This is shown at step 740.

The example approach described in FIG. 7 for importing new pronunciations from a user-specific custom lexicon of a first user to one or more user-specific custom lexicons of one or more additional users is provided by way of example only and is not intended to be limiting. Persons skilled in the relevant art(s) will appreciate that still other methods and approaches may be used to achieve substantially the same end.

Figure 8:
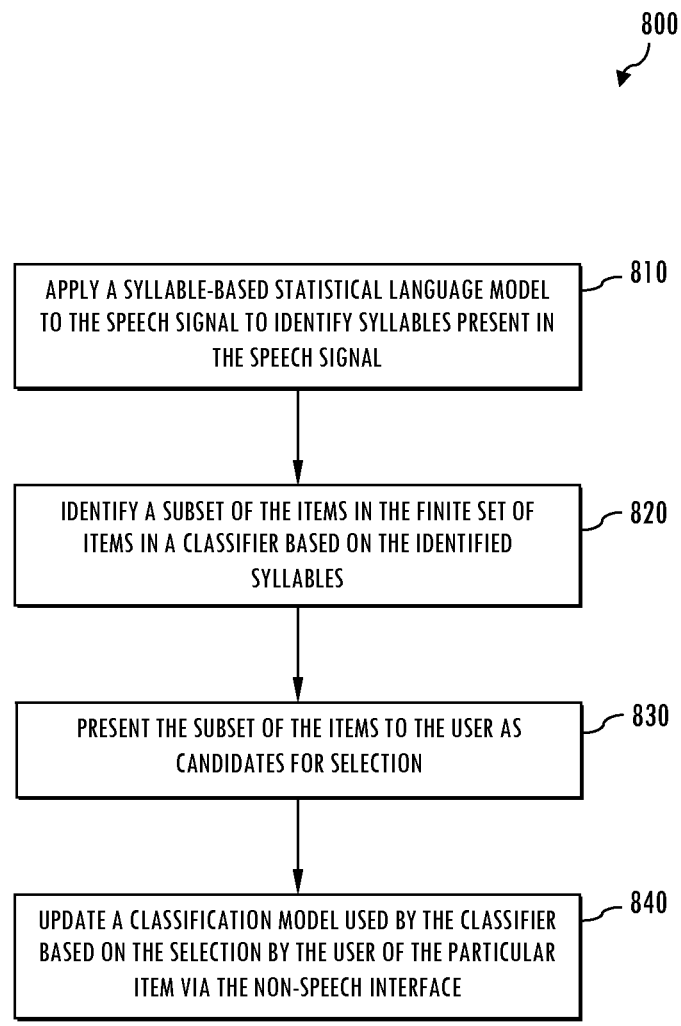
FIG. 8 depicts a flowchart of a method for prompting a user to select a particular item from among a finite set of items as part of a corrective mechanism in accordance with an embodiment.

In accordance with yet another embodiment, presenting the user with a means for selecting a particular item from among a finite set of items in step 250 of flowchart 200 may be carried out in the manner shown in flowchart 800 of FIG. 8. The method of flowchart 800 begins at step 810 in which a syllable-based statistical language model is applied to the misrecognized speech signal to identify syllables present in the speech signal. Then, at step 820, a subset of the items in the finite set of items is identified in a classifier based on the identified syllables. For example, the classifier may be able to select likely candidates for selection by matching one or more syllables identified in the speech signal to one or more syllables associated with items in the set. Then, at step 830, the subset of the items identified during step 820 is presented to the user as candidates for selection. By presenting the user with the candidates in this manner, the user may more quickly be able to find the item in which they are interested. Finally, at step 840, after the user has selected the particular item via the means for selecting, a classification model used by the classifier may be updated based on the selection by the user. That is to say, the performance of the classifier may be further improved by incorporating the user's selection into the classification model.

V. Example Computer System Implementations

Figure 9:
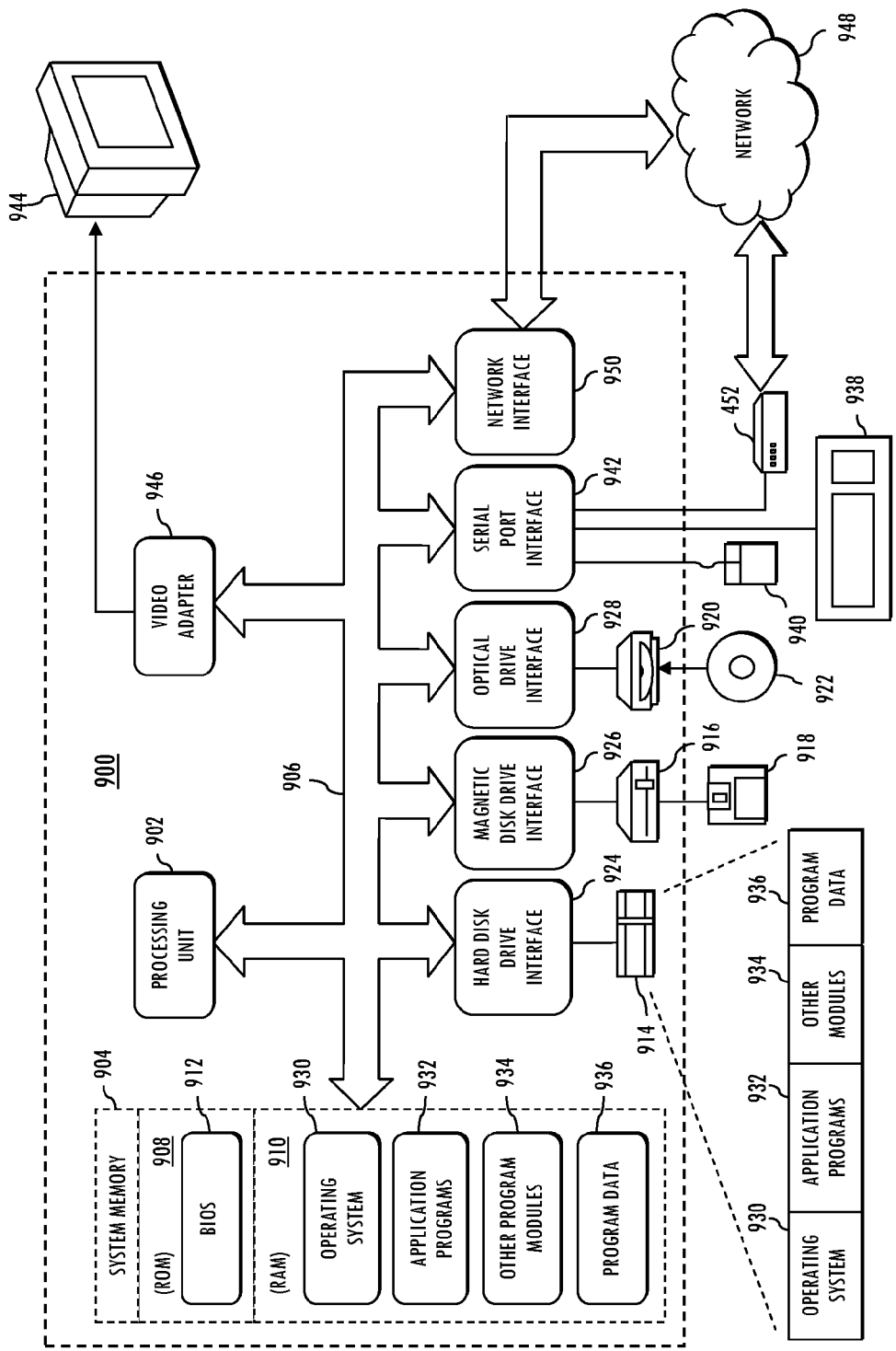
FIG. 9 is a block diagram of an example computer system that may be used to implement various embodiments described herein.

FIG. 9 depicts an example computer system 900 that may be used to implement various embodiments described herein. For example, computer system 900 may be used to implement any of speech interface 102, non-speech interface 104, and application 106 of system 100, devices $310_1$-$310_N$ and server 330 of FIG. 3, devices $410_1$-$410_N$ of FIG. 4, as well as any sub-components thereof. The description of computer system 900 provided herein is provided for purposes of illustration, and is not intended to be limiting. Embodiments may be implemented in further types of computer systems, as would be known to persons skilled in the relevant art(s).

As shown in FIG. 9, computer system 900 includes a processing unit 902, a system memory 904, and a bus 906 that couples various system components including system memory 904 to processing unit 902. Processing unit 902 may comprise one or more processors or processing cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computer system 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all of the functions and features of speech interface 102, non-speech interface 104, and application 106 of system 100, devices $310_1$-$310_N$ and server 330 of FIG. 3, devices $410_1$-$410_N$ of FIG. 4, as well as any sub-components thereof, as described elsewhere herein. The program modules may also include computer program logic that, when executed by processing unit 902, performs any of the steps or operations shown or described in reference to FIGS. 2 and 5-8.

A user may enter commands and information into computer system 900 through input devices such as a keyboard 938 and a pointing device 940. Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB).

A display 944 is also connected to bus 906 via an interface, such as a video adapter 946. In addition to display 944, computer system 900 may include other peripheral output devices (not shown) such as microphones, speakers and printers.

Computer system 900 is connected to a network 948 (e.g., a local area network or wide area network such as the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable medium" are used to generally refer to non-transitory media such as ROM 908 and RAM 910 used to implement system memory 904, the hard disk associated with hard disk drive 914, removable magnetic disk 918, removable optical disk 922, as well as other media such as flash memory cards, digital video disks, and the like.

As noted above, computer programs and modules (including application programs 932 and other program modules 934) may be stored on ROM 908, RAM 910, the hard disk, magnetic disk, or optical disk. Such computer programs may also be received via network interface 950 or serial port interface 942. Such computer programs, when executed by processing unit 902, enable computer system 900 to implement features of embodiments discussed herein. Accordingly, such computer programs represent controllers of computer system 900.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, any of speech interface 102, non-speech interface 104, and application 106 of system 100, devices $310_1$-$310_N$ and server 330 of FIG. 3, devices $410_1$-$410_N$ of FIG. 4, as well as any sub-components thereof, may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for updating a custom lexicon used by a speech recognition engine that comprises part of a speech interface, comprising:

obtaining a speech signal by the speech interface when a user speaks a name of a particular item for the purpose of selecting the particular item from among a finite set of items;

presenting the user with a means for selecting the particular item from among the finite set of items by providing input in a manner that does not include speaking the name of the item in response to determining that a phonetic description of the speech signal is not recognized by the speech recognition engine;

after the user has selected the particular item via the means for selecting, storing the phonetic description of the speech signal in association with a text description of the particular item in the custom lexicon, the custom lexicon comprising a user-specific custom lexicon that is used to recognize speech of the user only and a system custom lexicon that is used to recognize speech of all users of a system, the storing comprising:

determining if the particular item is of a particular type, automatically storing the phonetic description of the speech signal only in the user-specific custom lexicon in response to determining that the particular item is of the particular type, and automatically storing the phonetic description of the speech signal only in the system custom lexicon in response to determining that the particular item is not of the particular type; and elevating the phonetic description of the speech signal stored in the user-specific custom lexicon to the system custom lexicon in response to determining that a certain number of user-specific custom lexicons all include a same or similar pronunciation for the particular item.

2. The method of claim 1, wherein the speech interface is implemented on a first device, the method further comprising:

allowing a second device to access at least the custom lexicon for the purposes of implementing a speech interface on the second device.

3. The method of claim 1, further comprising:

storing multiple phonetic descriptions in association with the text description of the particular item in the custom lexicon.

4. The method of claim 3, wherein storing multiple phonetic descriptions in association with the text description of the particular item in the custom lexicon comprises:

storing only up to a limited number of phonetic descriptions in association with the text description of the particular item in the custom lexicon.

5. The method of claim 1, wherein presenting the user with the means for selecting the particular item from among the finite set of items by providing input in a manner that does not include speaking the name of the item comprises:

applying a syllable-based statistical language model to the speech signal to identify syllables present in the speech signal;

identifying a subset of the items in the finite set of items in a classifier based on the identified syllables; and presenting the subset of the items to the user as candidates for selection.

6. The method of claim 5, further comprising:

updating a classification model used by the classifier based on the selection by the user of the particular item via the means for selecting.

7. The method of claim 1, further comprising:

providing the phonetic description of the speech signal to a text-to-speech converter to produce a pronunciation; and prompting the user to confirm the pronunciation produced by the text-to-speech converter prior to storing the phonetic description of the speech signal in association with the text description of the particular item in the custom lexicon.

8. A system, comprising:

a speech recognition engine that is configured to generate a phonetic description of a speech signal obtained when a user speaks a name of a particular item into a speech interface for the purpose of selecting the particular item from among a finite set of items and to match the phonetic description of the speech signal to one of a plurality of phonetic descriptions included in a system lexicon or a custom lexicon;

a dialog manager that is configured to present the user with a means for selecting the particular item from among the finite set of items by providing input in a manner that does not include speaking the name of the item in response to determining that the speech recognition engine has failed to match the phonetic description of the speech signal to any of the phonetic descriptions included in the system lexicon or the custom lexicon;

a learning engine that is configured to store the phonetic description of the speech signal in association with a text description of the particular item selected by the user via the means for selecting in the custom lexicon, the custom lexicon comprising a user-specific custom lexicon and a system custom lexicon, the learning engine being configured to automatically store the phonetic description of the speech signal only in the user-specific custom lexicon based on a determination that the particular item is of a particular type and to automatically store the phonetic description of the speech signal only in the system custom lexicon based on a determination that the particular item is not of a particular type, and the learning engine is further configured to elevate the phonetic description of the speech signal stored in the user-specific custom lexicon to the system custom lexicon based on a determination that a certain number of user-specific custom lexicons all include a same or similar pronunciation for the particular item; and a network accessible storage system that stores the custom lexicon and makes the custom lexicon available to a plurality of network-connected devices for performing speech recognition functions.

9. The system of claim 8, wherein the learning engine is configured to store multiple phonetic descriptions in association with the text description of the particular item selected by the user in the custom lexicon.

10. The system of claim 8, wherein the learning engine is configured to store only up to a limited number of phonetic descriptions in association with the text description of the particular item selected by the user in the custom lexicon.

11. The system of claim 8, wherein the learning engine is configured to store the phonetic description of the speech signal in association with the text description of the particular item selected by the user in a user-specific custom lexicon that is used to recognize speech of the user only.

12. The system of claim 8, wherein the learning engine is further configured to store the phonetic description of the speech signal in association with the text description of the particular item selected by the-user in a second custom lexicon associated with a second user that is associated with the user.

13. The system of claim 8, wherein the speech recognition engine is further configured to apply a syllable-based statistical language model to the speech signal to identify syllables present in the speech signal and to use a classifier to identify a subset of the items in the finite set of items based on the identified syllables; and
wherein the dialog manager is configured to present the subset of the items to the user as candidates for selection.

14. The system of claim 13, wherein the speech recognition engine is further configured to update a classification model used by the classifier based on the selection by the user of the particular item via the means for selecting.

15. The system of claim 12, further comprising:
a text-to-speech converter that is configured to produce a pronunciation based on the phonetic description of the speech signal;
wherein the dialog manager is further configure to prompt the user to confirm the pronunciation produced by the text-to-speech converter prior to storing the phonetic description of the speech signal in association with the text description of the particular item selected by the user in the custom lexicon.

16. A computer program product comprising a non-transitory computer-readable medium having computer program logic recorded thereon for enabling a processing unit to update a custom lexicon dictionary used by a speech recognition engine that comprises part of a speech interface to an application, the computer program logic comprising:
first means for enabling the processing unit to obtain a speech signal when a user speaks a name of a particular item into the speech interface for the purpose of selecting the particular item from among a finite set of items;
second means for enabling the processing unit to obtain a text description of the particular item from the speech recognition engine based upon recognition of a phonetic description of the speech signal by the speech recognition engine; and
third means for enabling the processing unit to store the phonetic description of the speech signal in association with the text description of the particular item in a custom lexicon in response to determining that a measure of confidence with which the phonetic description of the speech signal has been recognized by the speech recognition engine is below a predefined threshold, the custom lexicon comprising a user-specific custom lexicon and a system custom lexicon, the third means further enables the processing unit to automatically store the phonetic description of the speech signal only in the user-specific custom lexicon based on a determination that the particular item is of a particular type, to automatically store the phonetic description of the speech signal only in the system custom lexicon based on a determination that the particular item is not of a particular type, and to elevate the phonetic description of the speech signal stored in the user-specific custom lexicon to the system custom lexicon based on a determination that a certain number of user-specific custom lexicons all include a same or similar pronunciation for the particular item.

17. The computer program product of claim 16, further comprising:
fourth means for enabling the processing unit to present the user with a means for selecting the particular item from among the finite set of items by providing input in a manner that does not include speaking the name of the particular item.

18. The computer program product of claim 17, further comprising:
fifth means for enabling the processing unit to prompt the user to make a selection via the means for selecting.

19. The computer program product of claim 18, further comprising:
sixth means for enabling the processing unit to update a classification model based on the selection by the user of the particular item via the means for selecting.

20. The computer program product of claim 17, wherein the third means further enables the processing unit to store the phonetic description of the speech signal in association with the text description of the particular item selected by the user in a second custom lexicon associated with a second user that is associated with the user.

* * * * *